(No Model.)

G. P. BISHOP.
HAME FASTENER.

No. 272,021. Patented Feb. 13, 1883.

WITNESSES:
Fred. G. Dieterich.
Jno. W. Stockett.

George P. Bishop.
INVENTOR.
by Louis Bagger & Co.
ATTORNEYS.

UNITED STATES PATENT OFFICE.

GEORGE P. BISHOP, OF NEWBURYPORT, MASSACHUSETTS.

HAME-FASTENER.

SPECIFICATION forming part of Letters Patent No. 272,021, dated February 13, 1883.

Application filed June 12, 1882. (No model.)

*To all whom it may concern:*

Be it known that I, GEORGE P. BISHOP, of Newburyport, in the county of Essex and State of Massachusetts, have invented certain new and useful Improvements in Hame-Fasteners; and I do hereby declare that the following is a full, clear, and exact description of the invention, which will enable others skilled in the art to which it appertains to make and use the same, reference being had to the accompanying drawings, which form a part of this specification, and in which—

Figure 1:
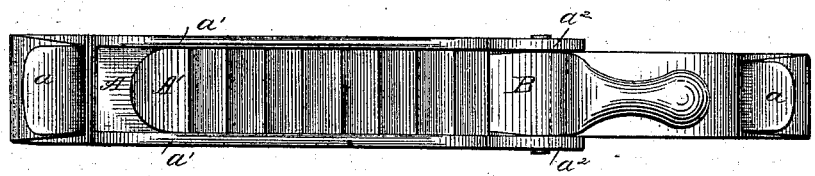
Figure 2:
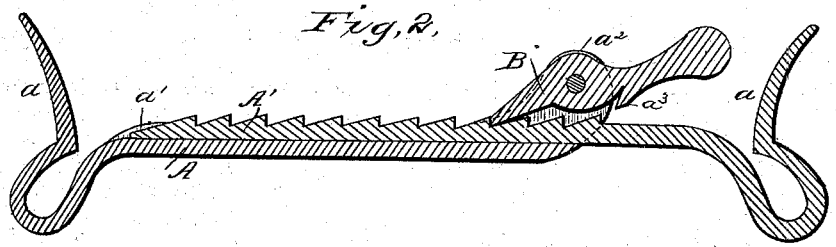

Figure 1 is a plan view of my improved hame-fastener, and Fig. 2 is a sectional view of the same.

The purpose of this invention is to effect the ready fastening and adjustment of the hames upon the collar; and it consists in the imployment of two parts, or a flanged bar having a toothed bar or rack sliding thereon, and a gravity-pawl engaging with said rack, each bar having means for its attachment to each part of the hame, substantially as hereinafter more fully set forth and claimed.

To carry out my invention, I employ, as observed by reference to the accompanying drawings, two bars, A A', each having a hook or spring-clasp, $a$, at one end, to permit its easy and ready attachment to the hames. The bar A has side flanges, $a'$, terminating into ears or apertured plates $a^2$ at one end thereof. A pawl, B, is hung between these ears $a^2$ to permit it to engage with the bar A', having teeth and sliding upon the bar A by gravity, so as to fasten automatically and adjust the bars at the desired point, according to size of the hames or collar upon which the hames are to be adjusted. The handle of the pawl B hangs downward to permit its point to gravitate into the coincident throat between any two of the teeth of the bar or rack A' as the two bars are drawn apart to accommodate the distance between the hames, or as they are separated to allow the removal of the hames from the collar. In addition to the point of the pawl, which engages the rack A', it may also have a tooth or cog upon its upper end to engage with the rack to prevent the accidental or sudden pulling out of the bar A of the rack as it is being adjusted, its said tooth riding in contact with the points of the teeth of the rack as the lower end of the pawl is elevated sufficiently to enable its point to clear the rack.

As above intimated, the handle or lower end of the pawl B is elevated to disengage its point from the rack as the bars A A' are adjusted to increase the length of the fastening, or are separated entirely for the removal of the hames from the collar.

Upon the pawl B is formed the hook or catch $a^3$, in rear of the pivot, which gives the pawl two engaging portions. This construction is important, as it allows the hame to be loosened slightly without becoming entirely disengaged from the collar—that is, when the toe of the pawl is lifted out of engagement with the ratchets the hook $a^3$ catches and prevents the bar A' from going a greater distance than the distance from one notch to the adjacent one. In this feature rests the gist of this invention.

I am aware that a gravital pawl in connection with a rack-arm has been used before in hame-fasteners, the rack-arm operating loosely upon the opposite arm, and such construction is not sought to be covered in this application.

I am also aware of the patents granted—No. 42,651, of 1864, No. 47,762, of 1865, and No. 81,650, of 1868—and the constructions set forth in said patents are hereby disclaimed.

What I do claim is—

The hame-fastener herein described, consisting of the bar A, having side flanges, $a'$, to form a way for the rack-bar A', the said flanges $a'$ being formed at one extremity into perforated ears $a^2$, in which is journaled the double gravital pawl B, having holding-hook $a^3$, which engages the rack-bar to hold the same when the handle of the pawl is depressed, the whole constructed, combined, and adapted to operate as and for the purpose set forth.

In testimony that I claim the foregoing as my own I have hereunto affixed my signature in presence of two witnesses.

GEORGE PORTER BISHOP.

Witnesses:
JOSEPH G. GIMSKY,
JOHN J. CURRIER.